Oct. 10, 1950 W. C. SWEET 2,525,734
FLOUR SIFTER
Filed Nov. 17, 1945

Webster C. Sweet,
INVENTOR.

BY Ralph Donath
Attorney

Patented Oct. 10, 1950

2,525,734

UNITED STATES PATENT OFFICE 2,525,734

FLOUR SIFTER

Webster C. Sweet, Pittsburgh, Pa.

Application November 17, 1945, Serial No. 629,234

3 Claims. (Cl. 209—293)

This invention relates to sifters and more particularly to the type which is adapted to sift flour.

As is well known in the bakery trade, the flour as it comes from the mill sometimes contains foreign matter, such as pieces of strings etc., which should be removed before using the flour for baking, moreover, the flour coming from the mill is likely to be lumpy and more or less moisture saturated which, of course, makes it undesirable because such condition would considerably decrease the yield. By thorough sifting, the moisture of the flour is removed, it also becomes aerated and whiter, thus the requirement of an extended storage for properly aging the flour is reduced.

It is therefore one of the main objects of the invention to provide a flour sifter by means of which any foreign matter may be quickly separated and at the same time aerating the flour.

Another object of the invention is to provide a device by means of which a large quantity of flour may be rapidly and thoroughly cleaned, dried and aerated, all at the same time.

Still another object of the invention is to provide a flour sifter with a rocking or continuously rotating drum in which stationary elements are used for agitating, brushing and scraping.

Yet another object of the invention is to provide a flour sifter with an adjustable scraper within the drum.

Another object of the invention is to provide a flour sifter with a feeding worm which feeds the flour to the sifting drum, in which both, the worm and the drum is rotated and the scraper and brush unit is stationary mounted within said drum.

Further objects of the invention are to provide a device of the class set forth which is simple in its construction and arrangements, efficient in its use, readily installed and inexpensive to manufacture.

To the accomplishment of these and such other objects as may hereafter appear the invention consists of the novel construction, combination and arrangement of parts herein specifically described and illustrated in the accompanying drawings, wherein is shown an embodiment of the invention, but it is to be understood that changes, variations and modifications may be resorted to which come within the scope of the claims hereunto appended.

In the drawings wherein like numerals of reference designate corresponding parts throughout the several views, Figure 1 is a longitudinal sectional view of a flour sifter in accordance with my invention with some parts broken away.

Figure 1:
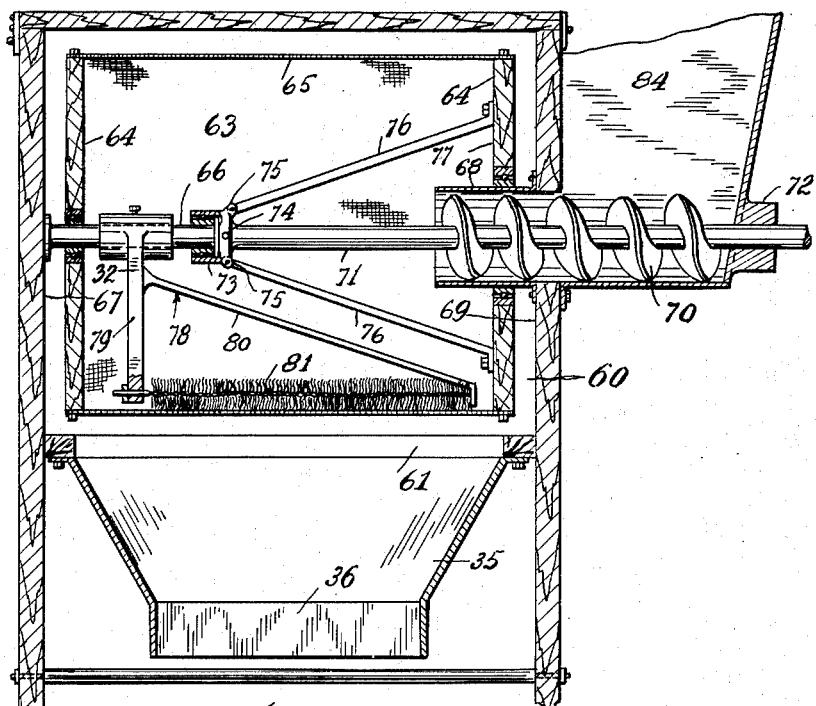
Figure 3:
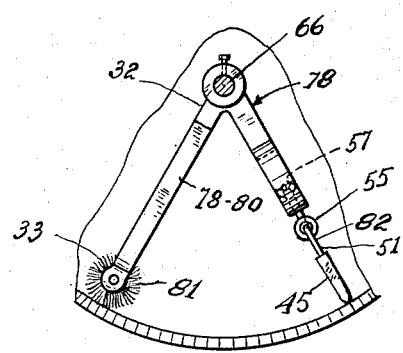
Figure 3 is an end view showing the relationship of the scraper assembly to the brush support member.
Figure 2:
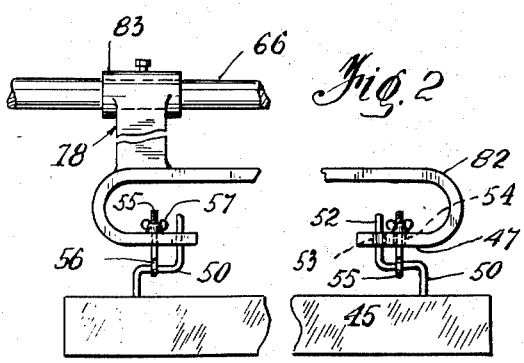
Figure 2 is a front view of the scraper as used in my invention.

The device shown in Figures 1 to 3 consists of a container 60 having an open bottom 61 which is provided with a discharge hopper 35 having a longitudinal delivery end 36 through which the sifted and aerated flour is discharged and re-sacked in any suitable manner.

In the embodiment shown the flour is sifted continuously and is delivered to a cylindrical drum 63 by means of a worm-screw 70. The said drum 63 is provided with side ends 64 and a screen covering 65 which is properly reinforced so the drum will retain its cylindrical shape.

Drum 63 is rotatably supported within said container 60 at one end on a stationary stub-shaft 66 secured to the inner side wall 67 of container 60. In alignment with said stub-shaft 66 is a worm-screw 70 mounted on a shaft 71 which terminates at one end in a ball bearing cap 73 secured to shaft 71 by a pin 74 or otherwise. The ball bearing cap is also provided with a pair of ears 75 in each of which is mounted a spider arm 76. These arms are secured to the inner face 77 of the drum end 64.

The tubular worm housing 68 is secured to the interior wall 69 of the container 60 in any suitable manner. Worm-screw shaft 71 is supported at the power end in a bearing 72.

By this construction it will be noted that when worm-screw shaft 71 is rotated the drum 63 also will rotate.

The stationary brush and scraper unit 78 is mounted on stub-shaft 66 and having a common bracket 32 of inverted V-shape, both, the brush and the scraper extend longitudinally along the interior of drum 63.

As shown in Figures 2 and 3 the scraper consists of an elongated scraper bar 45 which is suspended on an elongated arm 82 and turned inwardly at both ends. Arm 82 is secured to a bushing 83 which is bolted to the stationary stub-shaft 66 within the drum 63. As will be noted, the scraper shown in Figure 2 is constructed to permit an up and down adjustment of the scraper bar 45 and this is accomplished by providing a Z-shaped round bar 50, the lower end of which is secured to the scraper-bar 45 and the upper end 52 of which is freely inserted into an aperture 53 in the inwardly turned end 47 of arm 82. In alignment with aperture 53 is another hole 54 through which an eyebolt 55 is inserted, the eye 56 of which is first slipped over the Z-shaped bar 50 in a manner as shown in Figure 2 of the drawing.

To adjust the scraper bar 45 it is only required to turn the thumb-nut 57 on eyebolt 55 in either direction which either lowers or raises the scraper bar 45.

The scraper unit 78 is mounted on a bracket 79 having a guy-bar 80 between the brush 81 and the scraper bar 82 and is secured to the stub-shaft 66 as best shown in Figure 1.

The brush 81 is preferably of the type in which the bristles 83 are twisted between two wires so as to assume a substantially circular brush, the kind which may be obtained in the open market.

In operation, the attendant dumps the flour, as it comes from the mill, into the feed hopper 84 after which he places an empty bag over the delivery end 36 of the discharge hopper 35 in any suitable manner. The worm-screw 70 is then turned manually or by power, as desired.

The flour is now carried by the rotary worm-screw 70 into the interior of the rotating drum 63 after which the flour is thoroughly sifted and aerated through screen 65 of the drum 63 after which the flour drops into the discharge hopper 35 and through the delivery end 36 into a bag (not shown).

While I have described and illustrated the invention, I do not desire to be limited to the minor details shown and described.

I claim:

1. In a flour sifter of the kind described comprising a container having supporting legs; said container provided at its bottom with a discharge hopper; a sifter drum rotatably mounted within said container; a feeding hopper provided with a worm-screw mounted on a shaft and adapted to transfer material from said feeding hopper into the interior of said sifting drum; a tubular worm-screw housing secured to the inner wall of said container and penetrating centrally through said sifter drum; a stationary stub-shaft in axial alignment with said worm-screw shaft and secured to the opposite inner wall of said container; a scraper and brush unit fixedly mounted to said stationary stub-shaft and radially extending thereof in contact with the sifter drum; one end of said sifter drum rotatably mounted on said stationary stub-shaft and the opposite end of said sifter drum rotatably mounted on the exterior of said tubular worm-screw housing; and means to rotate said worm-screw and said sifter drum at the same speed.

2. A flour sifter as claimed in claim 1 in which the scraper and brush unit includes an inverted V-shaped bracket, a rotatable brush mounted on the end of one leg of the V-shaped bracket in contact with the sifter drum, an adjustable scraper bar mounted at the end of the other leg of the V-shaped bracket in contact with the sifter drum, and a guy member extending from the apex of the V-shaped member to support the scraper bar and rotatable brush.

3. A flour sifter as claimed in claim 2 in which the scraper forming a part of the scraper and brush unit includes a scraper bar and adjusting means for adjusting the radial position of the scraper bar to vary the pressure exerted by it upon the sifter drum.

WEBSTER C. SWEET.

REFERENCES CITED

The following references are of record in the file of this patent:

UNITED STATES PATENTS

| Number | Name | Date |
|---|---|---|
| 234,033 | Hastings | Nov. 2, 1880 |
| 241,845 | Davis | May 24, 1881 |
| 255,255 | Cook | Mar. 21, 1882 |
| 479,775 | Fuller | July 26, 1892 |
| 676,645 | Arnold | June 18, 1901 |
| 943,204 | Freischman et al. | Dec. 14, 1909 |
| 1,105,294 | Newell et al. | July 28, 1914 |
| 1,202,504 | Frerichs | Oct. 24, 1916 |
| 1,476,225 | Samsel | Dec. 24, 1923 |
| 1,949,697 | Smith | Mar. 6, 1934 |
| 2,245,650 | Christopherson | June 17, 1941 |

FOREIGN PATENTS

| Number | Country | Date |
|---|---|---|
| 16,670 | Great Britain | of 1893 |